United States Patent
Necklas (10) Patent No.: US 11,209,666 B2
(45) Date of Patent: Dec. 28, 2021

(54) EYEWEAR RETENTION DEVICE (71) Applicant: Christopher M. Necklas, Boston, MA (US)

(72) Inventor: Christopher M. Necklas, Boston, MA (US)

(*) Notice: Subject to any disclaimer, the term of this patent is extended or adjusted under 35 U.S.C. 154(b) by 1061 days.

(21) Appl. No.: 15/046,745

(22) Filed: Feb. 18, 2016

(65) Prior Publication Data
US 2016/0252749 A1 Sep. 1, 2016

Related U.S. Application Data (60) Provisional application No. 62/121,101, filed on Feb. 26, 2015.

(51) Int. Cl.
G02C 3/00 (2006.01)

(52) U.S. Cl.
CPC .................. G02C 3/006 (2013.01)

(58) Field of Classification Search
CPC ........... G02C 3/006; G02C 5/14; G02C 5/143
See application file for complete search history.

(56) References Cited

U.S. PATENT DOCUMENTS

| | | | | |
|---|---|---|---|---|
| 4,976,531 A * | 12/1990 | Kahaney | ................ | G02C 11/00 351/156 |
| 8,523,351 B1 * | 9/2013 | Cheong | .................. | G02C 3/003 128/864 |
| 2015/0370087 A1 * | 12/2015 | Terreri | .................... | G02C 3/006 351/157 |
| 2016/0033787 A1 * | 2/2016 | Relampagos | .......... | G02C 3/003 351/155 |

* cited by examiner

*Primary Examiner* — Christopher Stanford
*Assistant Examiner* — Journey F Sumlar
(74) *Attorney, Agent, or Firm* — Occhiuti & Rohlicek LLP

(57) ABSTRACT

An eyewear retention apparatus is configured for use with an eyeglass frame having a pair of temples, each temple having a first extremity configured to attach to a lens holder and a second extremity configured to rest behind an ear of a wearer. The eyewear retention apparatus includes a strap formed of a flexible material and having a length extending between first and second ends, wherein each of the first and second ends includes a first hole extending through the strap. The eyewear retention apparatus also includes first and second fittings, each of the first and second fittings includes an end region having an opening configured to receive a respective one of the second extremity of the pair of temples and a tab having a second hole. The eyewear retention apparatus further includes a fastener extending through the first hole and the second hole.

22 Claims, 10 Drawing Sheets

EYEWEAR RETENTION DEVICE

CROSS-REFERENCE TO RELATED APPLICATIONS

This application claims priority benefit from Provisional Application No. 62/121,101, filed Feb. 26, 2015, the contents of which are herein incorporated by reference.

BACKGROUND

This invention relates to the design and manufacturing of eyewear retention devices.

Figure 1A:
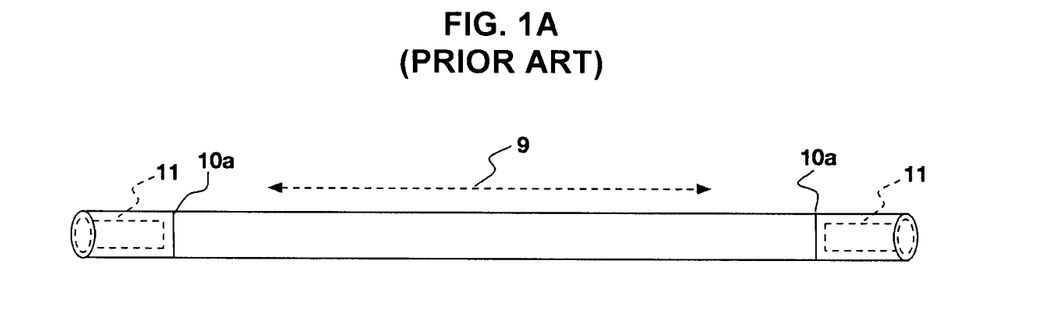
FIG. 1A is a schematic overview showing an example of a conventional eyewear retention device utilizing a piece of rubber/plastic tubing at each end which is wrapped in the eyewear retention strap material and secured with stitching.
Figure 1B:
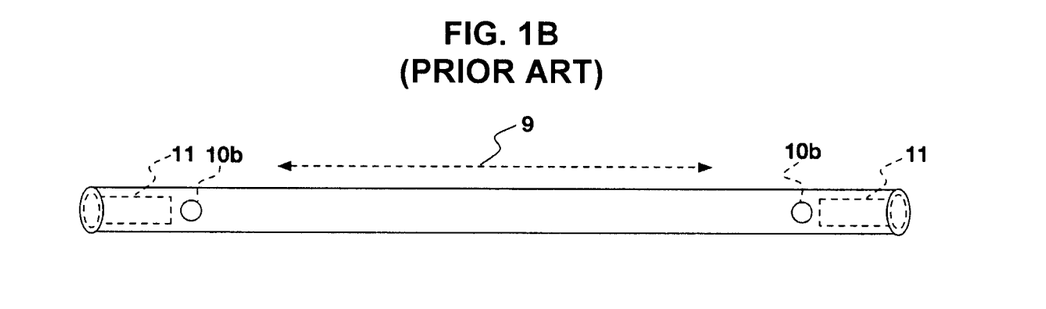
FIG. 1B is a schematic overview of a conventional eyewear retention device as shown in FIG. 1A utilizing rivets instead of stitching to hold the rubber/plastic tubing at the ends of the eyewear retention strap material.

Referring to FIG. 1, conventional eyewear retention devices are generally made from a single piece of rubber-like (e.g., neoprene) material 12 that is stitched at the ends 13 to form slots 14 to receive the eyewear temples 8 and secure the eyewear retention strap 12 to the eyewear frame temples 8. Retention devices made in this way do not work as well when low-stretch and/or low-grip materials such as cotton, nylon, polyester or leather are used. Such materials do not stretch as well to fit eyewear temples 8 of varying sizes and/or will not grip well to the eyewear temples 8. This causes the eyewear retention strap 12 to be prone to sliding off of the eyewear temples 8. Such retention devices are also bulkier on the eyewear temples 8 and can cause varying degrees of ergonomic discomfort depending on the thickness of the eyewear retention strap material 12.

Figure 2:
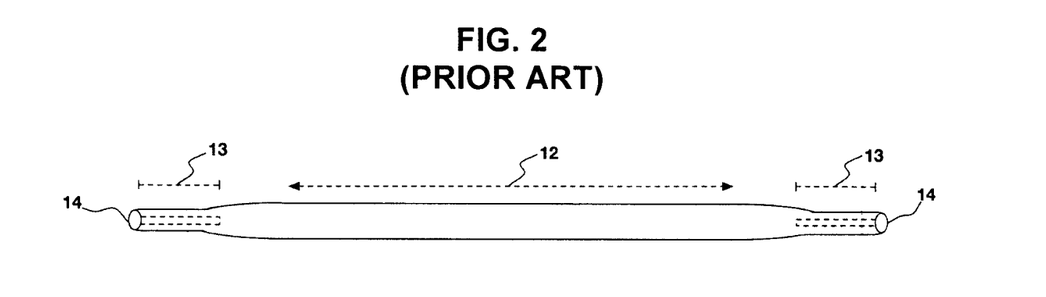
FIG. 2 is a schematic overview showing an example of a conventional eyewear retention device utilizing a single piece of material that is stitched at its ends.

Referring to FIGS. 2A and 2B, other conventional eyewear retention devices utilize rubber/plastic tube pieces 11 at the ends of cotton or similar eyewear retention strap 9. The eyewear retention strap material 9 is wrapped around the tube pieces 11 with the tubes 11 secured in place at the ends of the eyewear retention strap 9 with either stitching 10A or rivets 10B securing the eyewear retention strap material 9 to itself to close off the area where the tubes 11 have been inserted. The eyewear retention strap material 9 wrapping the tubes 11 adds bulk to the tubes 11 causing varying degrees of ergonomic discomfort at the point of contact between the eyewear temples 8 and the wearer's head. The material 9 wrapping the tubes 11 also reduces the grip of the tubes 11, which causes the amount of the eyewear temple 8 that needs to be inserted into the tubes 11 to be greater than is necessary with a higher grip material. This causes further ergonomic discomfort for the wearer of the eyewear frames.

SUMMARY

In a general aspect of the invention, an eyewear retention apparatus is configured for use with an eyeglass frame having a pair of temples, each temple having a first extremity configured to attach to a lens holder and a second extremity configured to rest behind an ear of a wearer. The eyewear retention apparatus includes a strap formed of a flexible material and having a length extending between a first end and a second end, wherein each of the first end and the second end includes a first hole extending through the strap. The eyewear retention apparatus includes a first fitting and a second fitting, each of the first fitting and the second fitting including an end region having an opening configured to receive a respective one of the second extremity of the pair of temples; and a tab having a second hole. The eyewear retention apparatus includes a fastener extending through the first hole and the second hole.

Embodiments of this aspect of the invention may include one or more of the following features. The fastener includes a cylindrical shaft having an elongated portion with a first diameter smaller than a second diameter of the second hole and a headed portion at a first end of the cylindrical shaft having a third diameter larger than the first diameter. The eyewear retention apparatus includes a cap sized and configured to cover a second end of the cylindrical shaft. In some embodiments, the cap is sized and configured to provide a friction fit with the shaft. The strap may be formed of cotton, nylon, polyester, leather. In embodiments, the first holes are smaller than diameter of cylindrical shaft. The fastener may include a rivet, button stud, cord, thread or string to retain the retention strap.

In certain embodiments, the strap includes two holes and the strap is configured to be folded in half length-wise such that the holes are coaxial. In other embodiments, the strap includes three holes in a Y configuration and strap is folded such that the three holes are coaxial.

Among other advantages an eyewear retention device of the present invention allows for the use of low-stretch, low-grip materials such as cotton, leather, nylon and polyester for the retention strap material while still providing a secure grip to the eyewear temples through the use of a rubber fitting directly connected to the retention strap at one end and eyewear temple at the other. These rubber fittings also minimize ergonomic discomfort for the wearer by adding the smallest possible amount of additional material to the ends of the eyewear temples. This is achieved through minimizing the wall thickness of the rubber fittings and ensuring they grip tightly enough to the eyewear temples that they only need to be attached to the very ends of the eyewear temples. Utilizing a hole or holes in the retention strap and a hole or holes in the rubber fittings ensures these two parts are able to be secured to one another in a manner that is operationally efficient for manufacturing at high volumes and durable enough to withstand daily wear through the use of a rivet, button stud, string, thread or cord assembly piece (as opposed to glue, heat shrink and/or another less secure and more time-intensive assembly method).

Other features and advantages of the invention are apparent from the following description, and from the claims.

DETAILED DESCRIPTION

Preferred embodiments of the present invention will be explained hereinafter in detail with reference to the accompanying drawings.

Referring to FIGS. 3, 4, 5A, 5B, 6A and 6B, an eyewear retention strap 6 includes a single hole 7 at each end. The eyewear retention strap 6 may be made from cotton, nylon, polyester, leather or any other similar material. The eyewear retention strap 6 is sized so that it is long enough to comfortably retain the wearer's eyewear frames while hanging from the back of the neck when they are not actively wearing the eyewear to shield their eyes.

Low-profile rubber fittings 1a contain a single tab 18 with a hole 3 to receive a male rivet end 5. The hole 3 is smaller than the shaft of the male rivet to account for the stretchiness of the rubber material that the rubber fitting 1a is made from. The rubber fitting 1a may be made from Neoprene, EPDM, Silicone, Latex or other similar or custom rubber formulation. The hole 3 stretches to fit the rivet shaft 5 and in doing so the amount beyond the size of the rivet shaft 5 that it will be able to stretch is minimized. This makes for a more secure attachment between the rubber fitting 1a and the male rivet shaft 5. The holes 3 in the rubber fittings 1a are incorporated in the design of the molds used to create the rubber fittings 1a. In doing so, the holes 3 do not contain abrasions that might be caused by puncturing the holes 3 post-manufacturing of the rubber fittings 1a which would make them prone to ripping. The male rivet shaft 5 is pressed through the hole 3 in the rubber fitting 1a tab 18. The male rivet shaft 5 with the rubber fitting 1a now attached is then pressed through the hole 7 in the retention strap 6 (these steps may be reversed). The connection is then secured by the female rivet cap 4 which is pressed into the end of the male rivet shaft 5 fastening the rubber fitting 1a and retention strap 6 together. It is important that the male rivet shaft 5 is long enough to accommodate the material of the rubber fitting 1a tab 18 and the retention strap 6 and receive the female rivet cap 4.

Figure 3:
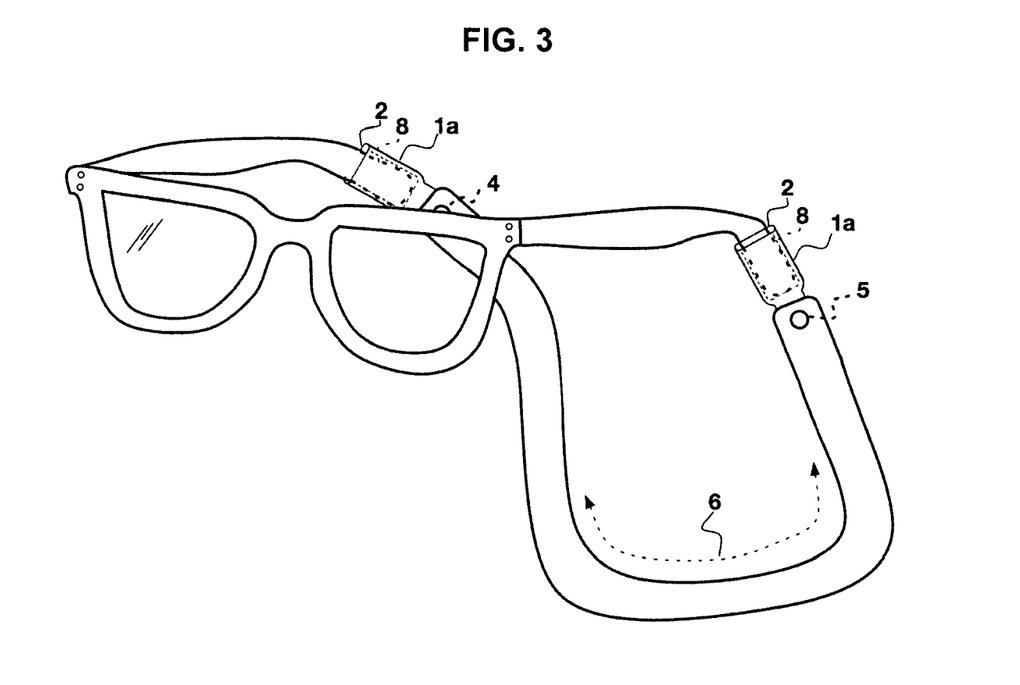
FIG. 3 is a schematic overview of an eyewear retention device according to an embodiment of the present invention and the way at which it connects to eyewear frame temples.
Figure 4:
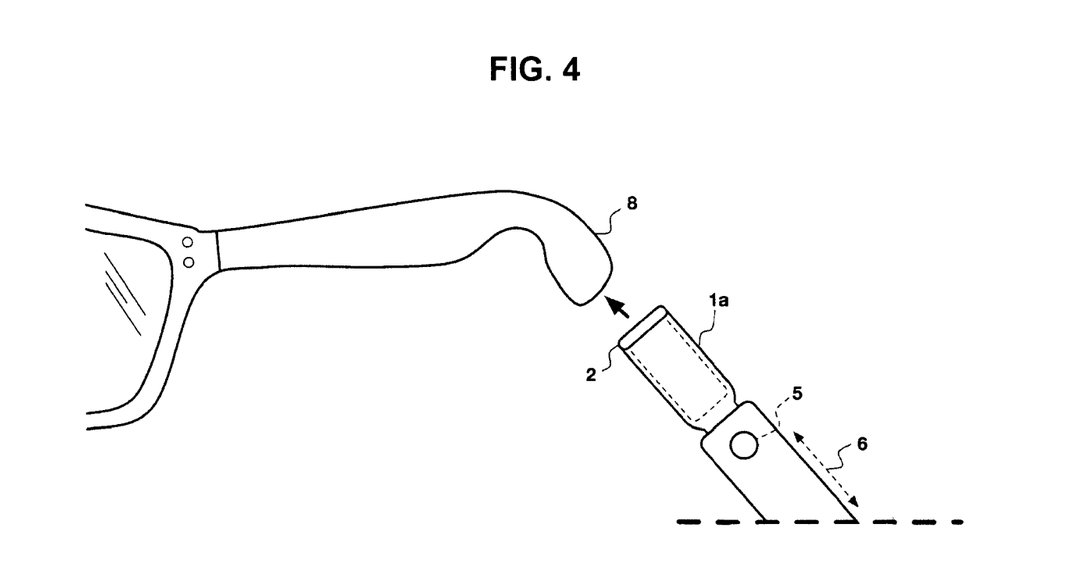
FIG. 4 is a schematic detail side view of an eyewear retention device shown in FIG. 3 and how it connects to the eyewear frame temple.
Figure 5A:
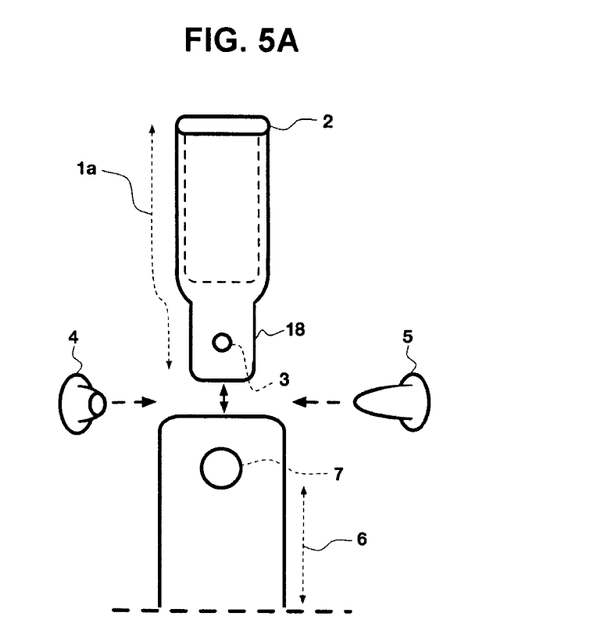
FIG. 5A is a schematic front view of the disassembled end portion of an eyewear retention device according to an embodiment of the present invention utilizing one hole in the eyewear retention strap material, a single tab rubber fitting and a rivet assembly.
Figure 5B:
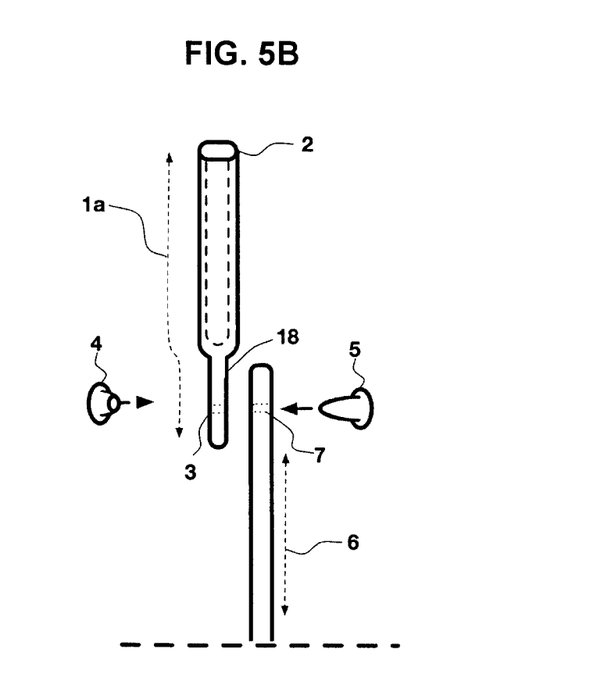
FIG. 5B is a schematic side view of the disassembled end portion of an eyewear retention device shown in FIG. 5A.
Figure 6A:
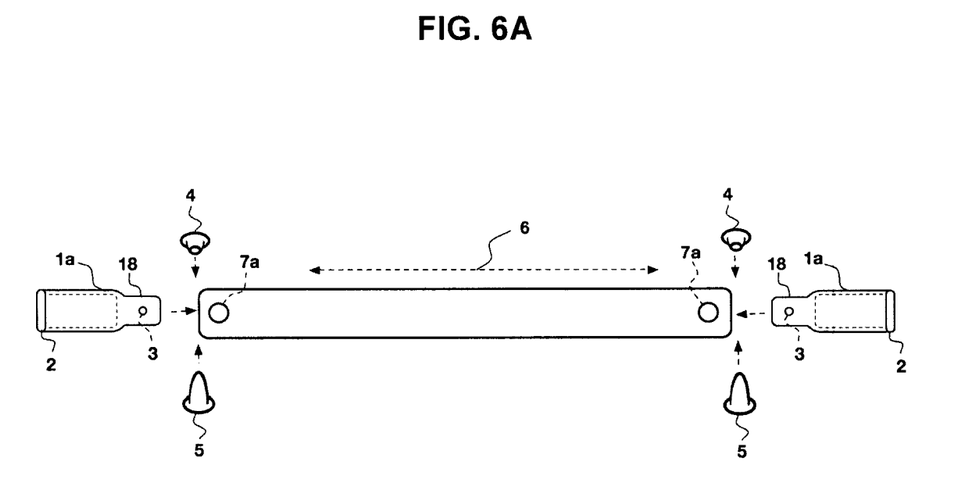
FIG. 6A is a schematic overview of a disassembled eyewear retention device according to an embodiment of the present invention utilizing one hole at each end of the eyewear retention strap material, single tab rubber fittings and rivet assembly.
Figure 6B:
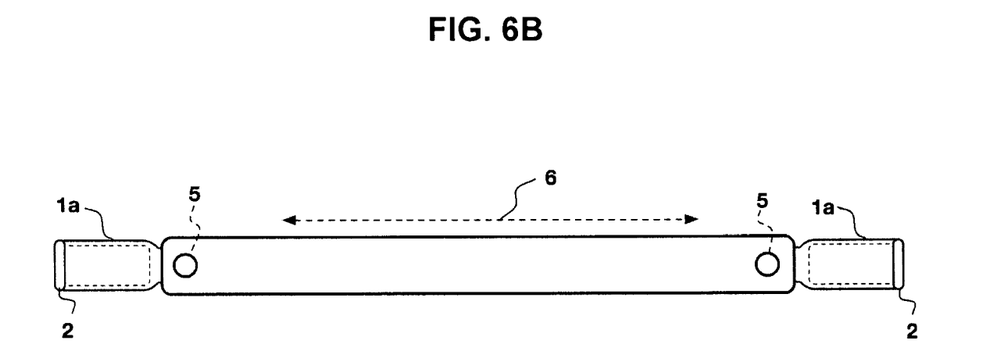
FIG. 6B is a schematic overview of an assembled eyewear retention device as it is shown in FIG. 6A.

The rubber fittings 1a contain a slot 2 to receive eyewear temples 8 as shown in FIGS. 3 and 4. These slots 2 are sized to stretch to fit eyewear temples 8 of varying sizes. The slots 2 are in the top portion of the rubber fitting 1a and stop before the tab 18 on the bottom portion of the rubber fitting 1a. The tab 18 of the rubber fitting 1a is solid (aside from the hole 3). The slots 2 to receive the eyewear temples 8 are illustrated with an oval shaped entry point but this entry point could also be circular. The slots 2 allow the eyewear temples 8 to be slid into the rubber fittings 1a. The eyewear temples 8 are long stems on each side of the eyewear frame that typically bend downward behind the ears of the wearer. It is at the very ends of the eyewear temples 8 that the rubber fittings 1a are attached. The rubber fittings 1a are manufactured with thin walls surrounding the slots 2 to minimize ergonomic discomfort that would be added to the eyewear temples 8 since the eyewear temples 8 are formed to follow the shape of the head behind the ears of the wearer.

Referring again to FIGS. 3, 4, 5A, 5B, 6A and 6B, the eyewear retention strap 6 is connected to the rubber fittings 1a through the use of a single hole 7 in the retention strap 6. There are additional ways to form this connection through the use of multiple holes 7 in the retention strap 6

Figure 7:
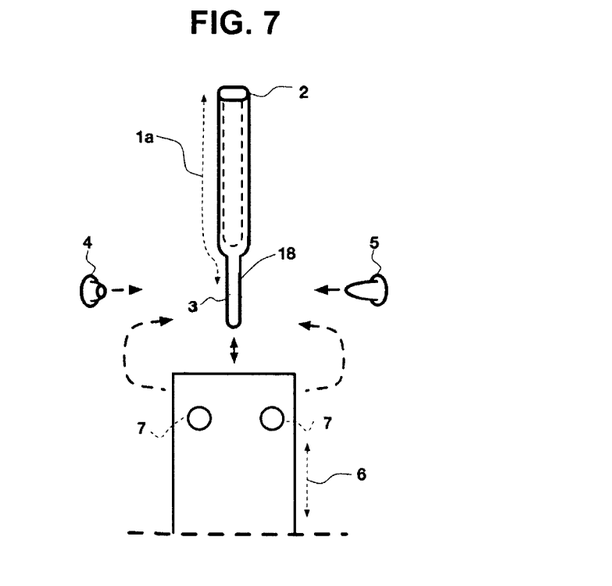
FIG. 7 is a schematic side view of the disassembled end portion of an eyewear retention device according to an embodiment of the present invention utilizing two holes at each end of the eyewear retention strap material, a single tab rubber fitting and rivet assembly.

For example, in FIG. 7, an eyewear retention strap 6 is shown with two holes 7 instead of one. The two holes 7 are each the same size and are spaced apart from one another left to right with enough space in the middle for the retention strap 6 to be folded in half length-wise at each end allowing the end of the retention strap 6 to wrap around the tab 18 of the rubber fitting 1a. The two holes 7 in the retention strap 6 are spaced so that when wrapped around the tab 18 they align on each side with the hole 3 in the tab 18. The male rivet shaft 5 is then pressed through the first hole 7 in the retention strap 6 followed by the hole 3 in the rubber fitting 1a and finally the second hole 7 in the retention strap 6 and capped with a female rivet cap 4 to secure the attachment. This is done at both ends of the retention strap 6. This method utilizing two holes 7 allows for the retention strap 6 to drape more naturally from the ends of the eyewear temples 8.

Figure 8A:
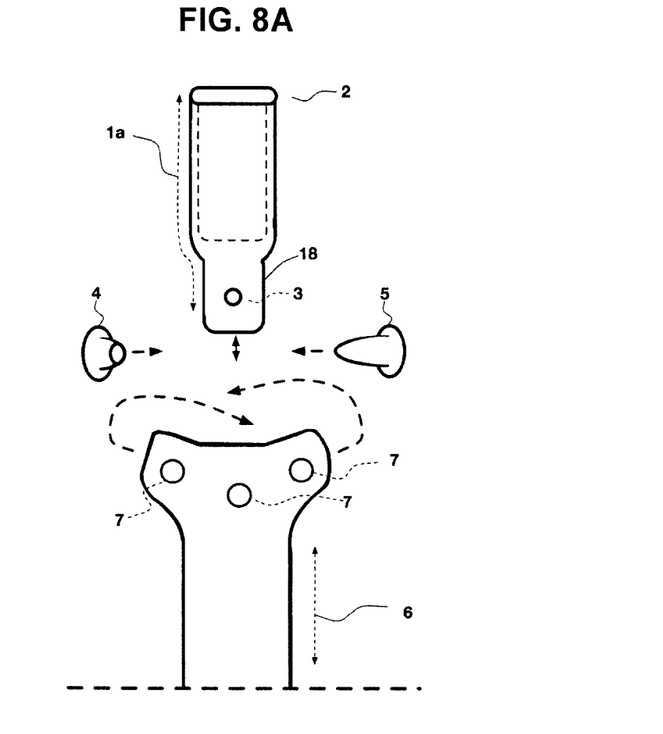
FIG. 8A is a schematic front view of the disassembled end portion of an eyewear retention device according to an embodiment of the present invention utilizing three holes at each end of the eyewear retention strap material, a single tab rubber fitting and rivet assembly.
Figure 8B:
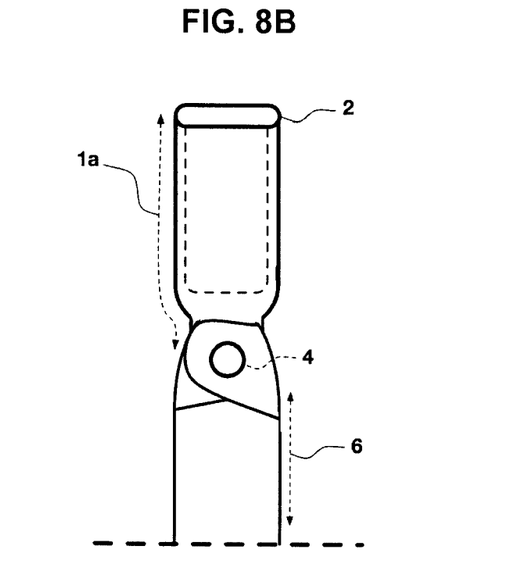
FIG. 8B is a schematic rear view of the disassembled end portion of an eyewear retention device shown in FIG. 8A.

In another example, as shown in FIG. 8A, a dissembled end portion of the eyewear retention device is shown utilizing three holes 7 at each end of the retention strap 6. In this design the end of the eyewear retention strap 6 resembles a "Y" configuration in which two flaps off the sides of the end of the retention strap 6 are wrapped around the tab 18 of the rubber fitting 1*a* and folded in such a way that the holes 7 in the retention strap align with the hole 3 in the rubber fitting 1*a* (as shown in FIG. 8B). All three holes 7 are the same size and one hole 7 is in the middle of the end of the retention strap 6 with the other two holes 7 each on one of the flaps in the "Y" configuration. A male rivet shaft 5 is pressed through the first hole 7 in the middle of the end of the retention strap 6 followed by the hole 3 in the tab 18 of the rubber fitting 1*a*, followed by the second hole 7 in one of the side flaps of the retention strap 6 that has been folded over to cover the back of the tab 18 and then the third hole 7 in the other flap of the retention strap 6 that is folded over on top of the first flap. The closure is capped off with a female rivet cap 4 to secure the attachment. This method utilizing three holes 7 provides for the tab 18 of the rubber fitting 1*a* to be wrapped on four of six sides by the retention strap 6.

Figure 9:
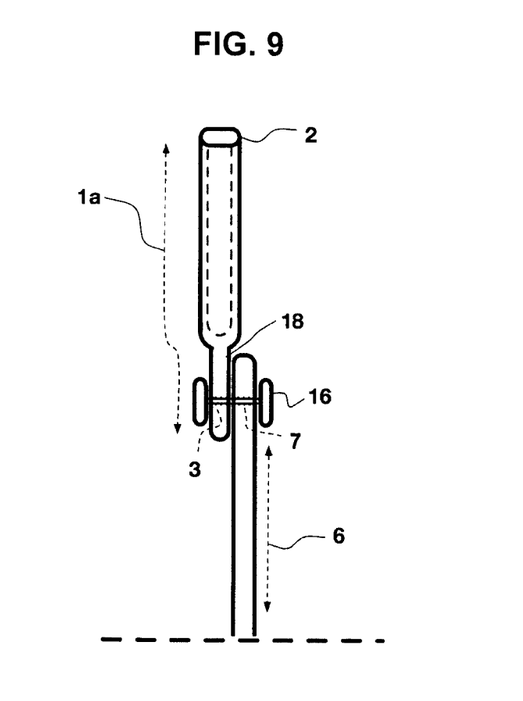
FIG. 9 is a schematic side view of the disassembled end portion of an eyewear retention device shown in FIG. 5B using a button stud assembly instead of a rivet assembly.

Referring to FIGS. 3, 4, 5A, 5B, 6A, 6B, 7, 8A and 8B, the eyewear retention device is shown with a rubber fitting 1*a* that is secured to the eyewear retention strap 6 through the use of a rivet (4, 5). Other fasteners that may be used include a button stud 16, as shown in FIG. 9. The button stud 16 connects the retention strap 6 to the rubber fitting 1*a* utilizing a shaft and two end caps similar to that of the rivet fastener (4, 5). The advantage of the button stud 16 is that unlike the rivet (4, 5) whose caps are usually permanently attached to the shaft once set, the button stud 16 may have a cap on one or both ends that unscrews, or disconnects in some other fashion, from the shaft. This allows the retention strap 6 to be easily disconnected from the rubber fittings 1*a*. In doing so, the rubber fittings 1*a* can be left attached to the eyewear temples 8 and the retention strap 6 may be connected when it is needed and disconnected when it is not. This may be simpler for the wearer than removing the rubber fittings 1*a* that tend to grip very tightly to the eyewear temples 8. This also provides the ability to interchange different eyewear retention straps 6 onto the same rubber fittings 1*a*. The wearer may want to interchange eyewear retention straps 6 because they are different sizes, materials, colors or patterns.

Figure 10:
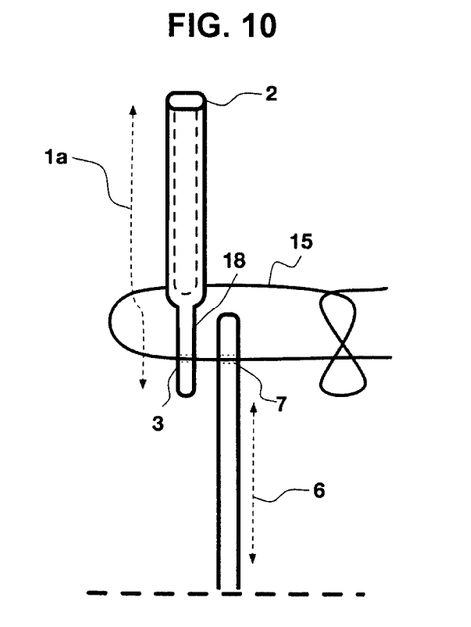
FIG. 10 is a schematic side view of the disassembled end portion of an eyewear retention device shown in FIG. 5B using a thread, string or cord assembly instead of a rivet assembly.

As shown in FIG. 10, a cord, thread or string 15 may also be used to connect the rubber fitting 1*a* to the retention strap 6, instead of a rivet 4, 5 or button stud 16. The cord, thread or string 15 is sewn through the hole(s) 7 in the retention strap 6 and the hole 3 in the rubber fitting 1*a*. The cord or string 15 is then tied to secure the connection. This method may be beneficial because the cord, thread or string 15 is lighter in weight than the rivet 4, 5 or button stud 16. The cord, thread or string 15 is also most likely to have a lower material cost than the rivet 4, 5 or button stud 16. The cord, thread or string 15 might also be chosen simply for aesthetic reasons.

In FIGS. 3, 4, 5A, 5B, 6A, 6B, 7, 8A, 8B, 9 and 10 the eyewear retention device is shown with a rubber fitting 1*a* that is of a single-tab 18 design.

Figure 11:
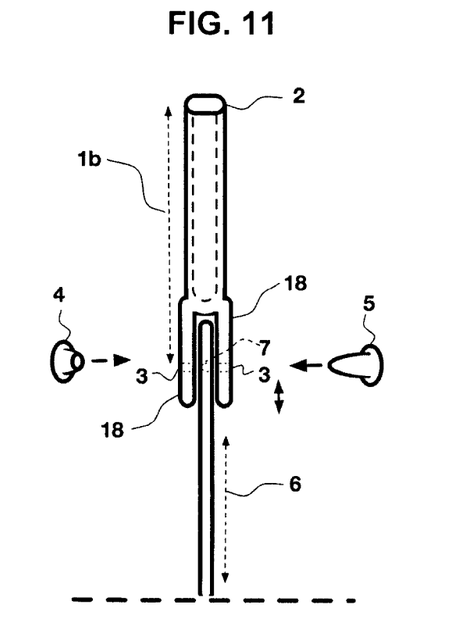
FIG. 11 is a schematic side view of the disassembled end portion of an eyewear retention device shown in FIG. 5B using a double-tab rubber fitting instead of a single-tab rubber fitting.

Referring to FIG. 11, an alternative embodiment of the eyewear retention device the rubber fitting 1*b* has a double-tab 18 design. The two tabs 18 protrude from the bottom of the rubber fitting 1*b* and are symmetrical in design. Each tab has a hole 3 to receive a fastener to secure the rubber fitting 1*b* to a retention strap 6. The tabs 18 are spaced apart from each other so that there is a gap large enough for the retention strap 6 to be inserted. In this embodiment, the eyewear retention strap 6 is positioned between the two tabs 18 of the rubber fitting 1*b* so that the hole 7 in the retention strap 6 aligns with the holes 3 in each tab 18 of the rubber fitting 1*b*. The fastener, which may include the rivet 4, 5, button stud 16, cord, thread or string 15, as previously described, is then affixed through the hole 3 in the rubber fitting 1*b* followed by the hole 7 in the retention strap 6 and lastly the second hole 3 in the rubber fitting 1*b*. This configuration allows for a symmetrical appearance on both sides of the eyewear retention device.

Figure 12:
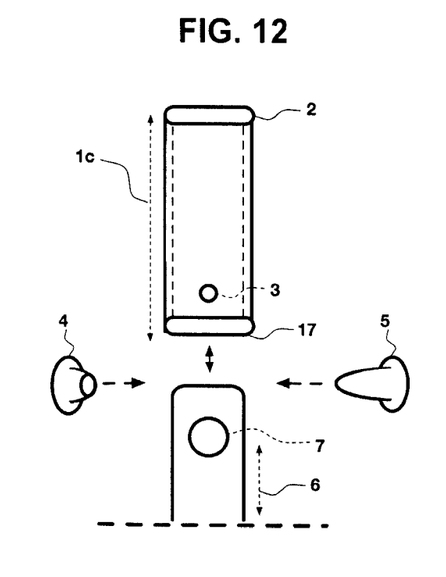
FIG. 12 is a schematic side view of the disassembled end portion of an eyewear retention device shown in FIG. 5A using a dual-entry rubber fitting instead of a single-tab rubber fitting.

Referring to FIG. 12, an additional embodiment of the eyewear retention device includes a rubber fitting 1*c* having a dual-entry design. With this embodiment, the rubber fitting 1*c* has a hole 2 at the top end and a hole 17 at the bottom end, forming a hollow tube. There is no tab 18. The rubber fitting has two holes 3 on opposite sides of the end containing the hole 17 to receive the retention strap 6. In this variation the retention strap 6 is slid inside the hole 17 so that the hole 7 in the retention strap aligns with the holes 3 in the rubber fitting 1*c*. A fastener as described previously is used to secure the retention strap 6 inside the rubber fitting 1*c*

With respect to the embodiments shown in FIGS. 3, 4, 5A, 5B, 6A, 6B, 7, 8A, 8B, 9, 10, 11 and 12 the retention strap 6 is formed of a single piece of material. If the material used for the retention strap is not suited to contain hole(s) 3 then a secondary piece of material is attached to the ends of the retention strap 6. This secondary piece of material functions in the same ways the end of the retention strap 6 functions. This secondary piece of material is attached to the end of the retention strap 6 typically by stitching and/or glue. This secondary piece of material at the ends of the retention strap 6 may also be used for aesthetic reasons.

Figure 13A:
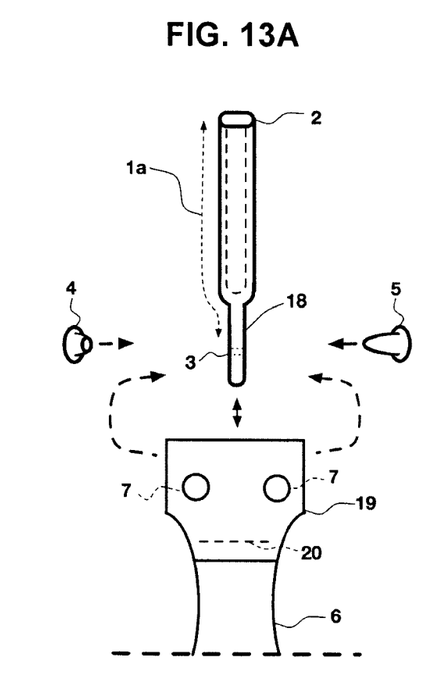
FIG. 13A is a schematic side view of the disassembled end portion of an eyewear retention device according to an embodiment of the present invention utilizing an additional piece of material attached to each end of the eyewear retention strap and two holes at the ends of the retention strap.
Figure 13B:
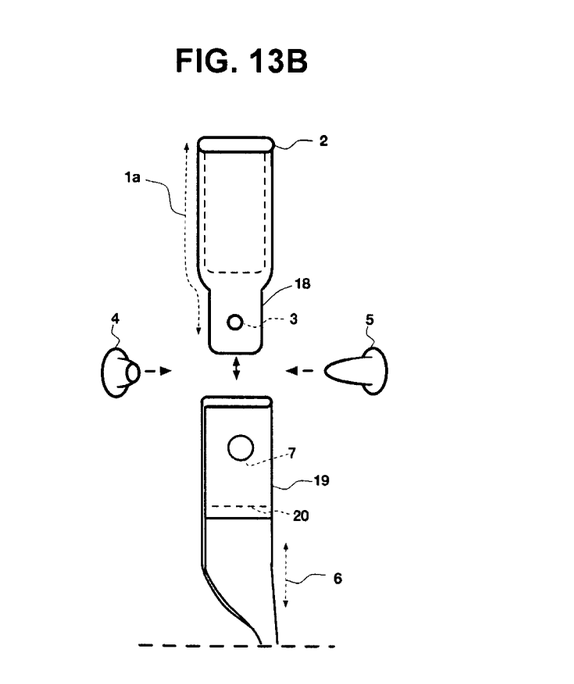
FIG. 13B is a schematic front view of the disassembled end portion of an eyewear retention device shown in FIG. 13A.

Referring to FIGS. 13A and 13B, a further embodiment of an eyewear retention device includes a retention strap 6 having an additional piece of material 19 at each end. The additional piece of material 19 is attached to each end of the retention strap 6. The additional piece of material 19 contains the hole(s) 7 to connect to the rubber fitting 1*a* through the use of a fastener 4, 5. The additional piece of material 19 is fastened to the retention strap 6 using stitching 20 and/or glue. In the two hole 7 design shown in FIGS. 13A and 13B the end of the retention strap 6 and the additional piece of material 19 are folded over the rubber fitting 1*a* so that the holes 7 align with the hole 3 in the tab 18. Additionally, where the additional piece of material 19 is attached to the retention strap 6 and folded it is stitched to keep it folded and to conceal the backside of the retention strap 6 where the additional piece of material 19 connects.

Figure 14A:
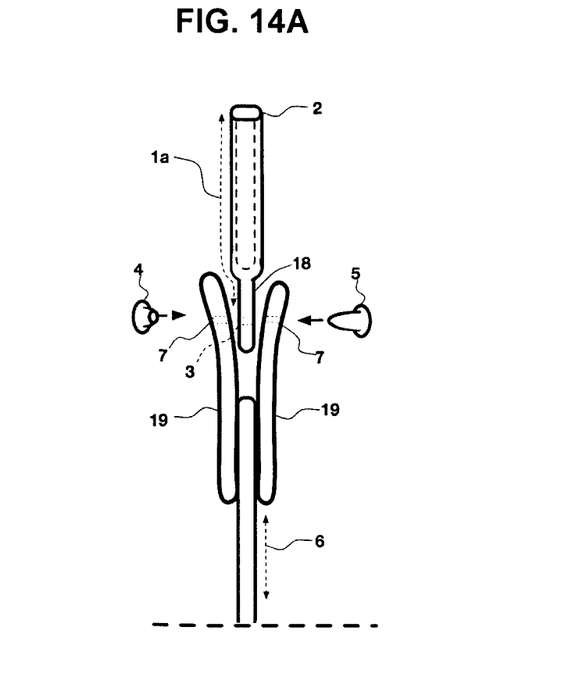
FIG. 14A is a schematic side view of the disassembled end portion of an eyewear retention device according to an embodiment of the present invention utilizing two additional pieces of material attached to each end of the eyewear retention strap.
Figure 14B:
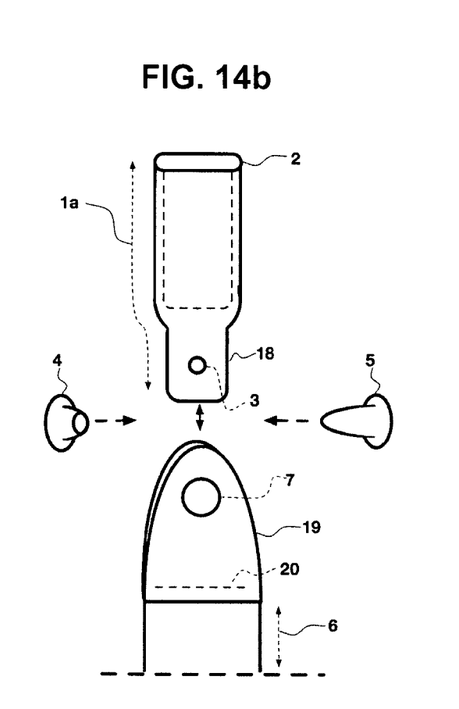
FIG. 14B is a schematic front view of the disassembled end portion of an eyewear retention device shown in FIG. 14A.

Referring to FIGS. 14A and 14B, an additional embodiment of an eyewear retention device includes a retention strap 6 having two additional pieces of material 19 at each end. The additional pieces of material 19 cap off the ends of the retention strap 6 and contains the hole(s) 7 to connect to the rubber fitting 1*a*, 1*b* or 1*c* through the use of a fastener 4, 5, 15, or 16. The additional pieces of material 19 are attached to the retention strap 6 using stitching 20 and/or glue at the very end of the retention strap 6.

As shown in FIGS. 14A & 14B, the eyewear retention device utilizes a single tab rubber fitting 1*a* and the two additional pieces of material 19 cover each side of the tab 18 of the rubber fitting 1*a* so that the holes 7 align with the hole 3 in the tab 18. In this example a rivet 4, 5 is used to secured the attachment.

Though the development of the present invention materials like cotton, nylon, polyester, leather and other similar types of low-stretch, low-grip materials may be used as eyewear retention straps 6 by attaching directly, or indirectly through the use of additional piece(s) of material 19, to rubber fittings 1a, 1b, 1c through the use of rivets 4, 5, cord, string or thread 15 or button studs 16 inserted through hole(s) 3 in the rubber fittings 1a, 1b, 1c and hole(s) 7 in the eyewear retention strap 6 or additional piece(s) of material 19. This manufacturing method provides a secure, economical, ergonomic, durable and fashionable attachment between the eyewear retention strap 6 and the rubber fitting 1a, 1b, 1c and between the rubber fitting 1a, 1b, 1c and the eyewear temples 8. This method provides a means from producing eyewear retention devices made from low-stretch and/or low-grip materials like cotton, nylon, polyester, leather or other similar materials.

It is to be understood that the foregoing description is intended to illustrate and not to limit the scope of the invention, which is defined by the scope of the appended claims. Other embodiments are within the scope of the following claims.

What is claimed is:

1. An eyewear retention apparatus for use with an eyeglass frame having a pair of temples, each temple having a first extremity configured to attach to a lens holder and a second extremity configured to rest behind an ear of a wearer, the eyewear retention apparatus comprising:
    a strap formed of a flexible material and having a length extending between a first end and a second end, wherein each of the first end and the second end includes a first hole extending through the strap;
    a first fitting and a second fitting, each of the first fitting and the second fitting including:
    an end region having an opening configured to receive a respective one of the second extremity of the pair of temples; and
    a tab having a second hole; and
    a fastener extending through the first hole and the second hole.

2. The eyewear retention apparatus of claim 1, wherein the fastener includes a cylindrical shaft having an elongated portion with a first diameter smaller than a second diameter of the second hole and a headed portion at a first end of the cylindrical shaft having a third diameter larger than the first diameter.

3. The eyewear retention apparatus of claim 2, wherein the fastener further comprises a cap sized and configured to cover a second end of the cylindrical shaft.

4. The eyewear retention apparatus of claim 3, wherein the cap is sized and configured to provide a friction fit with the shaft.

5. The eyewear retention apparatus of claim 2, wherein the second holes are smaller than the first diameter of the cylindrical shaft.

6. The eyewear retention apparatus of claim 1 wherein the strap's first end includes in addition to the first hole, an additional hole that is disposed such that when the first end of the strap is folded in half length-wise, the first and additional holes are coaxial.

7. The eyewear retention apparatus of claim 1, wherein the strap's first end includes, in addition to the first hole, first and second additional holes that are disposed such that, when the strap is unfolded, the resulting three holes are in a "Y" configuration and, when the strap is folded, the three holes are coaxial.

8. The eyewear retention apparatus of claim 1, wherein the fastener includes a cord, thread, or string that passes through said first and second holes to retain the retention strap.

9. The eyewear retention apparatus of claim 1, wherein the fastener includes a button stud that passes through said first and second hole to retain the retention strap.

10. The eyewear retention apparatus of claim 1, wherein, for each of the first and the second fitting, the tab is a first tab and the fitting comprises a second tab that is separated from the first tab by a gap that is large enough for insertion of the first end, wherein, in addition to extending through the first and second holes, the fastener extends through a hole in the second tab.

11. The eyewear retention apparatus of claim 1, wherein said retention strap comprises first and second additional pieces of material that are attached to said length at each end of the retention strap, wherein each additional piece of material comprises said first hole and a first hole and a third hole, and wherein said fastener extends through said third hole in addition to extending through said first hole and said second hole.

12. The eyewear retention apparatus of claim 1, wherein the fitting is a molded fitting that remains unpunctured after molding thereof.

13. The eyewear retention apparatus of claim 1, wherein the second hole is aligned with the first hole when the fastener is extended through the first hole and the second hole.

14. The eyewear retention apparatus of claim 1, wherein in addition to first hole, the strap comprises an additional hole, wherein the strap is folded in half length-wise along a line perpendicular to a line defined by the first hole and the additional hole, and wherein the fastener extends through the first hole, the additional hole, and the second hole.

15. The eyewear retention apparatus of claim 1, wherein the strap's first end comprises flaps, each having a hole formed therethrough, wherein the flaps are folded such that the holes in the flaps are aligned with the first hole of the tab, and wherein the fastener extends through the first hole, the second hole, and the holes in the flaps.

16. The eyewear retention apparatus of claim 1, wherein said tab comprises a hollow tube that receives said strap and said fastener secures said strap to said fitting by passing through said first hole, said second hole, and an additional hole that is coaxial with said first and second holes.

17. The eyewear retention apparatus of claim 1, wherein said retention strap comprises first and second stitching that fastens said first and second ends of said length.

18. The eyewear retention apparatus of claim 1, wherein said fastener comprises a rivet cap and a rivet shaft, wherein said rivet shaft comprises a rivet end onto which said rivet cap is pressed.

19. The eyewear retention apparatus of claim 1, wherein said fastener comprises a shaft having a diameter that is greater than that of said second hole and wherein said shaft extends through said second hole.

20. The eyewear retention apparatus of claim 1, wherein the fastener includes a tapered shaft that extends through said first and second holes.

21. An apparatus for retaining an eyeglass frame on a wearer, said apparatus comprising a flexible strap that comprises a first end that is perforated by a first-end hole, a second end that is perforated by a second-end hole, and a length that extends between said first end and said second end, a first fitting that comprises a first-fitting hole passing therethrough, an opening that receives a distal end of a first temple of said eyeglass frame, and a first fastener that passes through said first-fitting hole and that also passes through said first-end hole, thereby securing said first end of said flexible strap to said first fitting, and a second fitting that comprises a second-fitting hole passing therethrough, an opening that receives a distal end of a second temple of said eyeglass frame, and a second fastener that passes through both said second-fitting hole and also through said second-end hole, thereby securing said second end of said flexible strap to said first fitting.

22. An apparatus for retaining an eyeglass frame on a wearer, said apparatus comprising a flexible strap having strap holes and ends thereof and means for coupling said flexible strap to temples of said eyeglass frame, same means for coupling comprising means for receiving said temples, a plurality of tabs, each of which comprises a tab hole formed therethrough, and means for fastening said means for coupling to said ends of said strap, wherein said means for coupling comprises means for engaging said tab holes with corresponding ones of said strap holes.

* * * * *